(12) United States Patent
Heston

(10) Patent No.: US 11,834,279 B2
(45) Date of Patent: Dec. 5, 2023

(54) ADJUSTABLE ROW SUPPORT FOR A PALLETIZER

(71) Applicant: Top Tier, LLC, Clackamas, OR (US)

(72) Inventor: Stephen L. Heston, Clackamas, OR (US)

(*) Notice: Subject to any disclaimer, the term of this patent is extended or adjusted under 35 U.S.C. 154(b) by 120 days.

(21) Appl. No.: 17/634,826

(22) PCT Filed: Jul. 29, 2020

(86) PCT No.: PCT/US2020/043930
§ 371 (c)(1),
(2) Date: Feb. 11, 2022

(87) PCT Pub. No.: WO2021/030052
PCT Pub. Date: Feb. 18, 2021

(65) Prior Publication Data
US 2022/0324661 A1   Oct. 13, 2022

Related U.S. Application Data

(60) Provisional application No. 62/886,402, filed on Aug. 14, 2019.

(51) Int. Cl.
*B65G 57/06* (2006.01)
*B65G 47/08* (2006.01)
*B65G 57/24* (2006.01)

(52) U.S. Cl.
CPC ............ *B65G 57/06* (2013.01); *B65G 57/24* (2013.01); *B65G 47/082* (2013.01); *B65G 2203/0233* (2013.01); *B65G 2203/0283* (2013.01)

(58) Field of Classification Search
CPC  B65G 57/06; B65G 57/24; B65G 2203/0233; B65G 2203/0283; B65G 47/086; B65G 57/00; B65G 57/10; B65G 47/90; B65G 47/082; B65G 47/084
USPC ..................... 414/792.1, 792.6, 791.8, 791.9
See application file for complete search history.

(56) References Cited

U.S. PATENT DOCUMENTS

| | | | |
|---|---|---|---|
| 4,830,337 A | 5/1989 | Ichiro et al. | |
| 4,995,224 A | 2/1991 | Yourgalite et al. | |
| 6,164,900 A | 12/2000 | Labell et al. | |
| 7,736,120 B2 | 6/2010 | Pierson et al. | |
| 8,145,350 B2 | 3/2012 | Lancaster, III et al. | |

OTHER PUBLICATIONS

International Search Report and Written Opinion, dated Oct. 13, 2020, issued for International Patent Application No. PCT/US2020/043930, 7 pages.

*Primary Examiner* — Gregory W Adams
(74) *Attorney, Agent, or Firm* — Klarquist Sparkman, LLP

(57) ABSTRACT

Apparatus and methods for automatically conforming a bottom support surface in a pick and place palletizer to the width of items such as cases that are supported on the surface are described. The invention defines an improved apparatus and method for automatically adjusting the width of a row support surface to conform to undersized items or items having a width when an item side is against the apron backstop that is less than the apron depth relative to the backstop.

25 Claims, 13 Drawing Sheets

ADJUSTABLE ROW SUPPORT FOR A PALLETIZER

CROSS REFERENCE TO RELATED APPLICATIONS

This is the U.S. National Stage of International Application No. PCT/US2020/043930 filed Jul. 29, 2020, which was published in English under PCT Article 21(2), which in turn claims the benefit of U.S. Provisional Application No. 62/886,402, filed Aug. 14, 2019. The provisional application is incorporated herein in its entirety.

TECHNICAL FIELD

The present invention relates to apparatus and methods for automatically conforming a bottom support surface in a pick and place palletizer to the width of items such as cases that are supported on the surface.

BACKGROUND

Palletizing generally refers to a process of constructing a stack of items organized as layers on a pallet. A pallet is a standard support and carrier structure used in shipping and provides a support surface for receiving items stacked for transport. Efficient shipping of palletized items calls for efficient stacking of items on the pallet to minimize open space within the stack. Accordingly, a variety of "item patterns" have emerged for efficient and stable packing together of items in item layers on a pallet. In some applications unit loads are built effectively identical to loads on the pallet absent the pallet itself with a slip sheet providing load support or without any underlying support structure. Whether loads are built on pallets or without pallets, the common art name is palletizing.

Two common methods on palletizing consist of layer building palletizers and robotic pick and place palletizing. Layer building palletizers typically employ various mechanisms to manipulate items into rows of items spaced and turned appropriately to construct rows. Rows of items are then transferred to a layer assembly platform through various means until a layer is completed. Depending on the location of the of the layer assembly device, the completed layer is transferred to the load under construction. Typically, the layer construction device has a layer support surface commonly called an apron. The apron can be rigid or flexible and in either style the apron is pulled from under the layer of items to deposit the layer on the pallet or previously deposited layer. Prior to deposit it is common to condition the layer that may be loosely assembled using various clamping means. Where the layer is assembled relative to the load under construction varies. Layers can be built horizontally offset then raised or lowered then moved horizontally for deposit. The layer can be assembled above the load under construction and either the layer assembly device is lowered to the load under construction for deposit or the load itself is raised to the fixed layer assembly device that opens to deposit the layer. A third method is to build less than complete layers that are transferred to the layer assembly device that vertically positions above the load under construction. All methods and techniques used are common in the art of layer building palletizing.

Pick and place palletizing is typically done with a programmable robotic mechanism to pick and place an item, item groups or previously constructed layers from a picking location to pallet load under construction. Unless the layer was previously constructed by other means, the pick and place device picks and places items into their finished position on the load under construction. A characteristic of such pick and place actions is the item or items are picked in such a manner that the actual gripping device does not hinder final positioning of an item or items on the load. Top picking vacuum gripping systems are most common where there is no gripping mechanism below the top of the item or items being picked and placed allowing tight placement of item or items adjacent to each other on the load under construction. Side gripping devices or bottom support devices are alternative gripping devices. Side grippers are effective and more positive than top picking vacuum methods, but whatever the thickness of the side gripper is becomes a void between adjacent items in the finished load unless the pick and place device performs a secondary bump to remove the void. Bottom support devices are more problematic if a tight-finished load is desired as the bottom support must have horizontal clearance to disengage from supporting the item or items bottom when depositing. Typically, a horizontal space at the periphery of the load or the load pattern is required and this space interior to the load limits load pattern flexibility. Regardless of the item or items, known pick-and-place gripping devices typically need to slow down for accurate final placement. And, in most instances, move items or items at speeds slower than the programmable mechanism is capable of due to insecure gripping. The most common top picking vacuum gripping method is especially susceptible to insecure handling requiring slower speeds.

One known problem with item or items bottom support pick and place palletizers relates to the difficulty of adjustment of the bottom support surface to conform to item bottoms. If the item bottom is wider or longer than the support surface so item or items partially cantilevers from the support surface, the item or items can be placed adjacent previously deposited items without the bottom support apron conflicting with deposit. If the item or items orientation is such that the depth or width relative to the support surface is smaller than the support surface, reliable deposit is a problem. Apron systems of all types use resistance between the item bottoms and the apron surface to register and items against a hard stop creating a uniform location for an item or items as the apron is removed. If the apron has greater depth than the item or items being supported, either the items are transferred to locate against the apron backstop leaving exposed apron to interfere with placement of items or items immediately adjacent to previous deposited items or the opposite occurs, item or items are transferred to the edge of the apron so they can be placed adjacent to a deposited item or items. But, when the apron is removed, apron removal will pull the item or items with it until the backstop prevents further travel with the apron and the travel distance of the item or items becomes an undesired gap in the load. The problem can be acute in normal palletizing of interlocked loads. Such loads have rows orientated where some cases are deposited with the narrow face against the apron backstop and other rows the wide side against the apron backstop. Any interlocked load will have at least one row with a different length or width against the apron backstop relative to other rows in the layer. Often half the rows are of one type or the other. If an item is 9" wide by 15" long being handled by an apron that is 14" deep, each item or row of items with the 9" width against the apron backstop will cantilever off the apron 1" so there are no issues depositing tight to adjacent layers. When the same item or items are in the rotated orientation for the load, the 15" face is against the apron backstop making the apron 5" too deep to properly deposit adjacent prior item or items. Unless a bottom support apron depth relative to apron backstop can be adjusted to be smaller or match the depth of an item or items being palletized with adjustment often required more than once for each layer, proper loads cannot be built.

There is a need therefore for a compact palletizer, especially a pick and place palletizer, that more quickly, accurately and more efficiently creates rows and layers for palletizing and more quickly builds an entire pallet of items where there are some items in the load that are relatively less wide than others.

The present invention comprises an improved apparatus and method for automatically adjusting a row support surface to conform to undersized item or items having a depth when an item side is against the apron backstop that is less than the apron depth relative to the backstop.

BRIEF DESCRIPTION OF THE DRAWINGS

The invention will be better understood, and its numerous objects and advantages will be apparent by reference to the following detailed description of the invention when taken in conjunction with the following drawings.

in FIG. 8 the pusher bar is shown in an intermediate position.

FIG. 13 illustrates a layer in which two cases are swept to build row 1, three cases are swept to build row 2, and 1 case is turned to build row 3.

FIG. 14 illustrates a layer in which two cases are swept to build rows 1 and 2, 1 case is swept to build row 3, and 1 case is turned to build row 4.

FIG. 15 illustrates a layer in which one case is swept to build rows 1 through 5, and 1 case is turned to build row 6.

FIG. 16 is a top plan view of a layer of cases on a standard pallet (40×48 inches, as illustrated) wherein the layer comprises 6 rows.

FIG. 17 is a perspective view of a single case of the type that is formed into the layer shown in FIG. 16. The case has dimensions of 7×5×3.5 inches.

FIG. 18 is a perspective view of the layer of cases shown in FIG. 16.

FIG. 19 is a perspective view of a loaded pallet in which the load comprises 15 layers of cases of the type shown in FIG. 17, and wherein each layer is formed in the pattern shown in FIG. 18 with layers alternating; the height dimension shown in FIG. 19 is the distance from the top surface of the load to the floor beneath the pallet on which the load is built.

DETAILED DESCRIPTION OF THE ILLUSTRATED EMBODIMENTS

Figure 1:
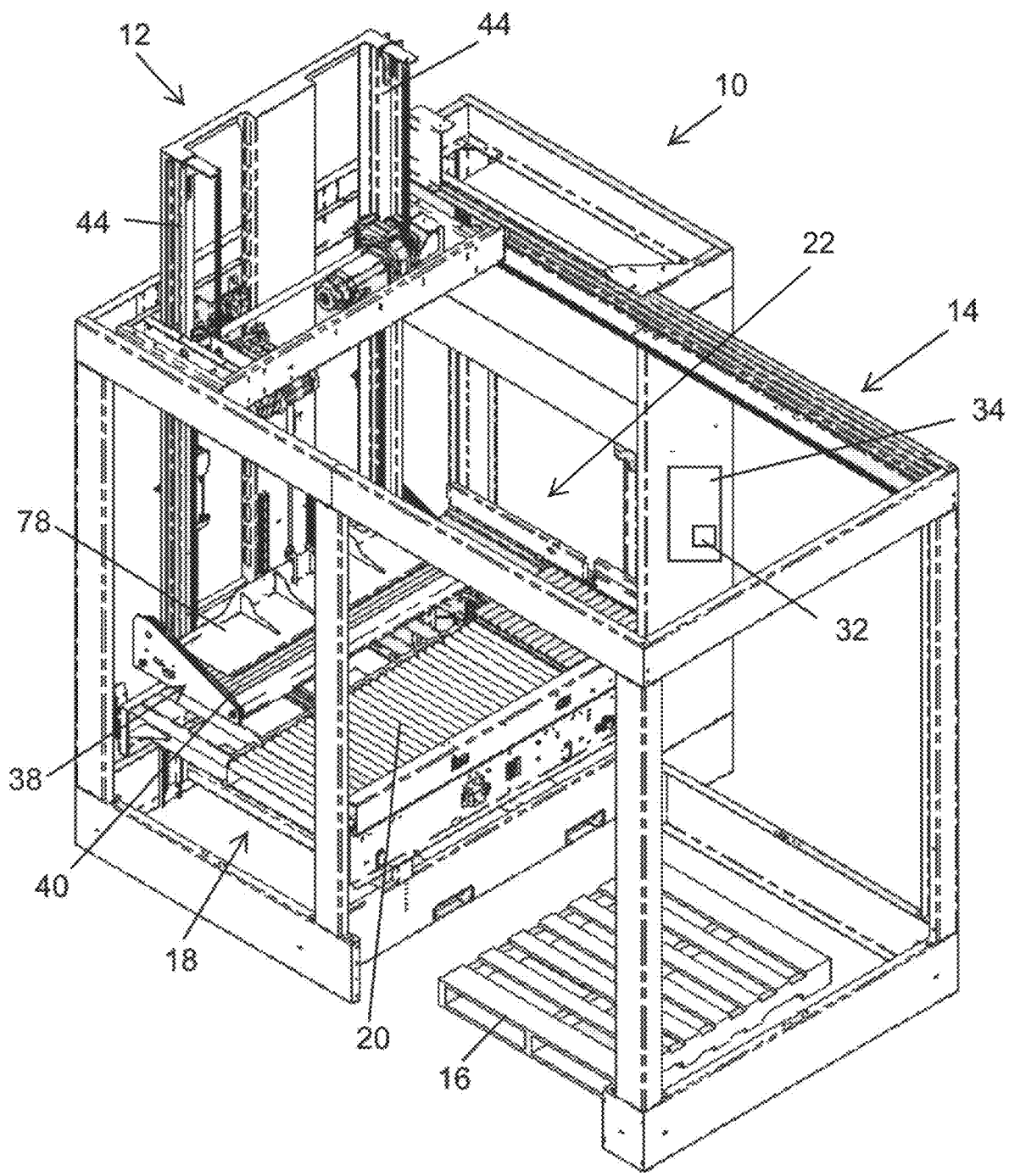
FIG. 1 is a perspective view of a machine assembly of a palletizing machine incorporating an adjustable row support mechanism according to the invention.
Figure 8:
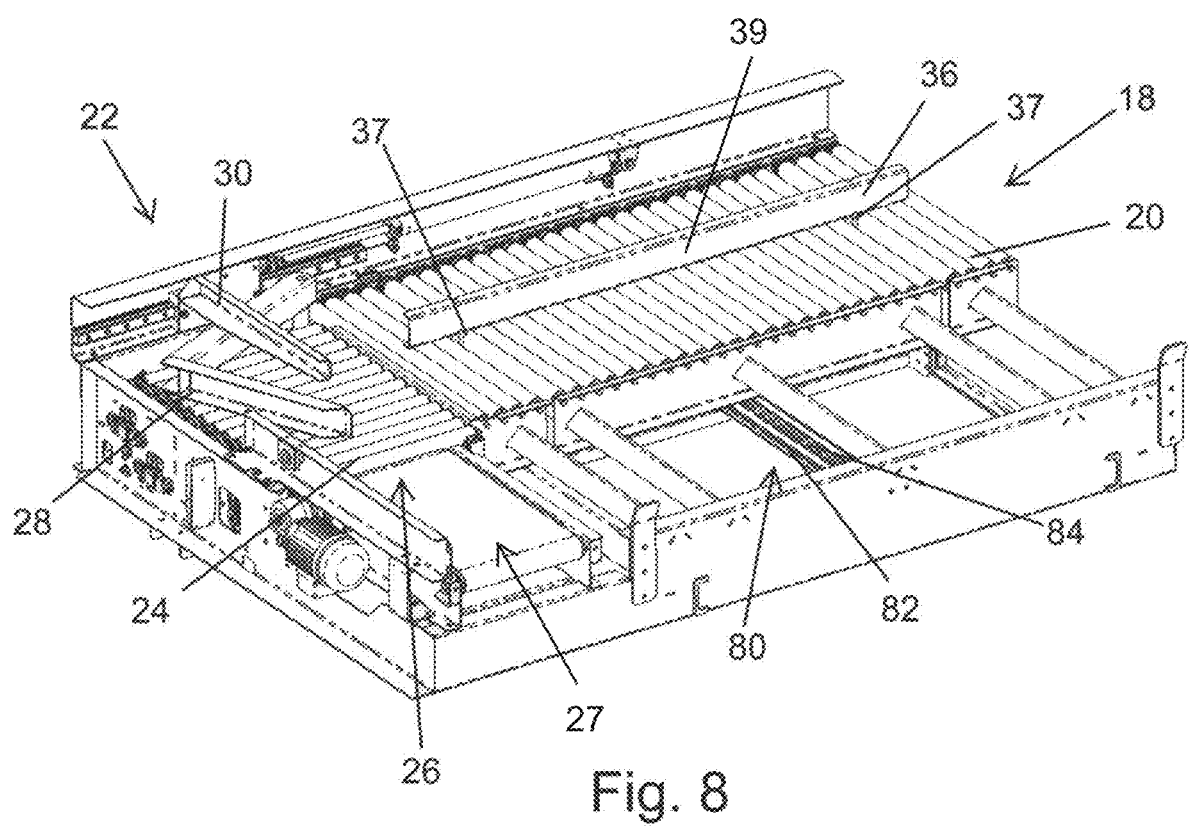
FIG. 8 is perspective view of the sweep turn and row build mechanism that assembles rows of items and transfers the assembled rows onto the pick and place assembly.
Figure 12:
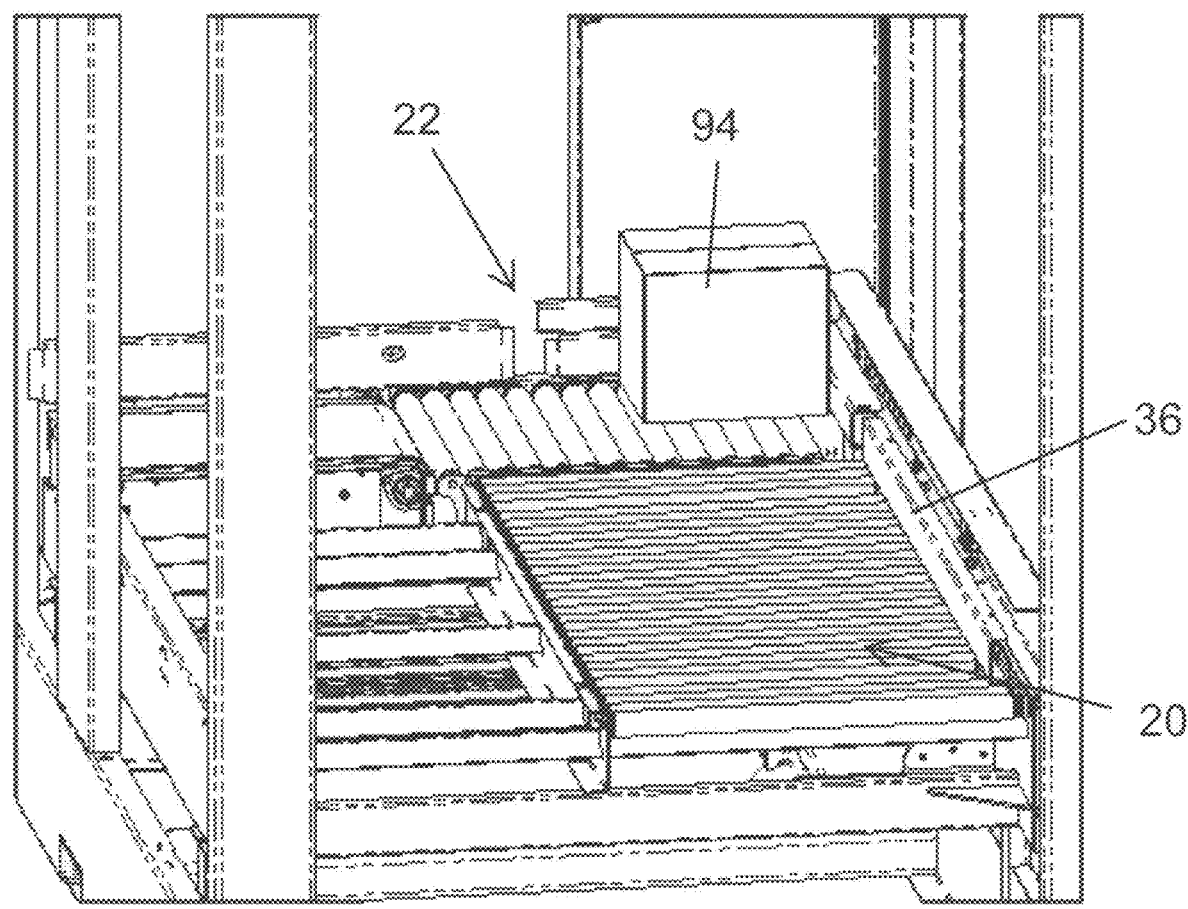
FIG. 12 is a perspective of the present invention illustrating a case positioned on the sweep and turn system, ready to be swept onto the row build assembly.

The primary structural components of adjustable row support apparatus 10 (referred to generally as "apparatus 10") are described first with reference to the drawings, and especially with respect to FIG. 1 for the purposes of describing the general environment and structures. The apparatus 10 is illustrated in a pick and place type of palletizer and the pick and place carriage 12 is shown in isolation in FIG. 3, described below. In FIG. 1 it may be seen that the pick and place carriage 12 is supported in a framework assembly 14. A pallet 16 is oriented adjacent a row build surface 18 that is defined by plural rollers 20 (typically driven rolls). The apparatus 10 is preferably combined with a sweep and turn system 22, which is shown in isolation in FIG. 8 and which is located upstream of the row build system 20 (upstream in terms of product flow through apparatus 10). The sweep and turn system 22 includes plural rollers 24 that define a receiving platform 26 onto which individual or plural items (such as cases 94, (e.g., FIG. 12)) are delivered from an upstream infeed system, which is partially shown in FIG. 8 and identified generally with reference number 27. The sweep and turn system 22 is shown with a turn paddle 28 and a sweep paddle 30, which are conventional in structure and operation and not described for those reasons. There are many mechanisms that may be utilized for their function.

Operationally, items such as cases 94 are delivered to the sweep and turn row build system 20 and oriented in a desired orientation with sweep and turn system 22 according to a build menu 32 that is defined by software in a controller 34 that controls the entire operation of the apparatus 10, and which are shown schematically in FIG. 1. More specifically, the turn paddle 28 is operable to turn an item by 90 degrees if called for in the build menu, and the sweep paddle 30 advances the properly oriented item onto the row build surface 18. A single item or more than one item may be operated on in a single cycle by the sweep and turn system. A row pusher 36 is reciprocally movable above the upper surface of the row build surface 18 to push assembled rows of items thereon to the row support surface that is defined by roller floor support surface 38 of the row support apparatus 10, as detailed below. The row pusher 36 is shown in an intermediate position in FIG. 8 and in a fully retracted, or home position, in FIG. 9.

Figure 3:
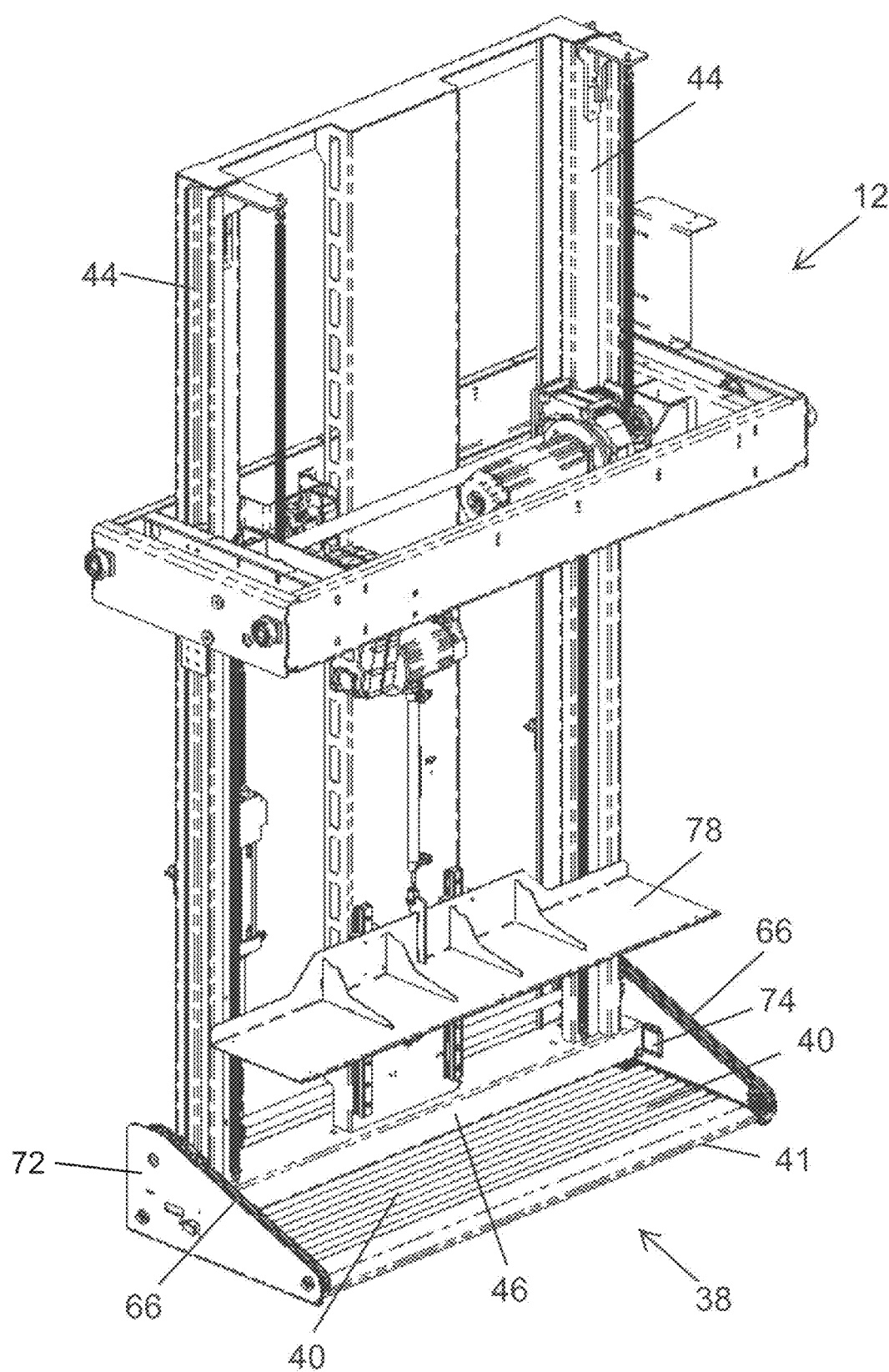
FIG. 3 is a perspective view of the pick and place carriage of the invention shown in isolation and including the adjustable roller support floor.
Figure 9:
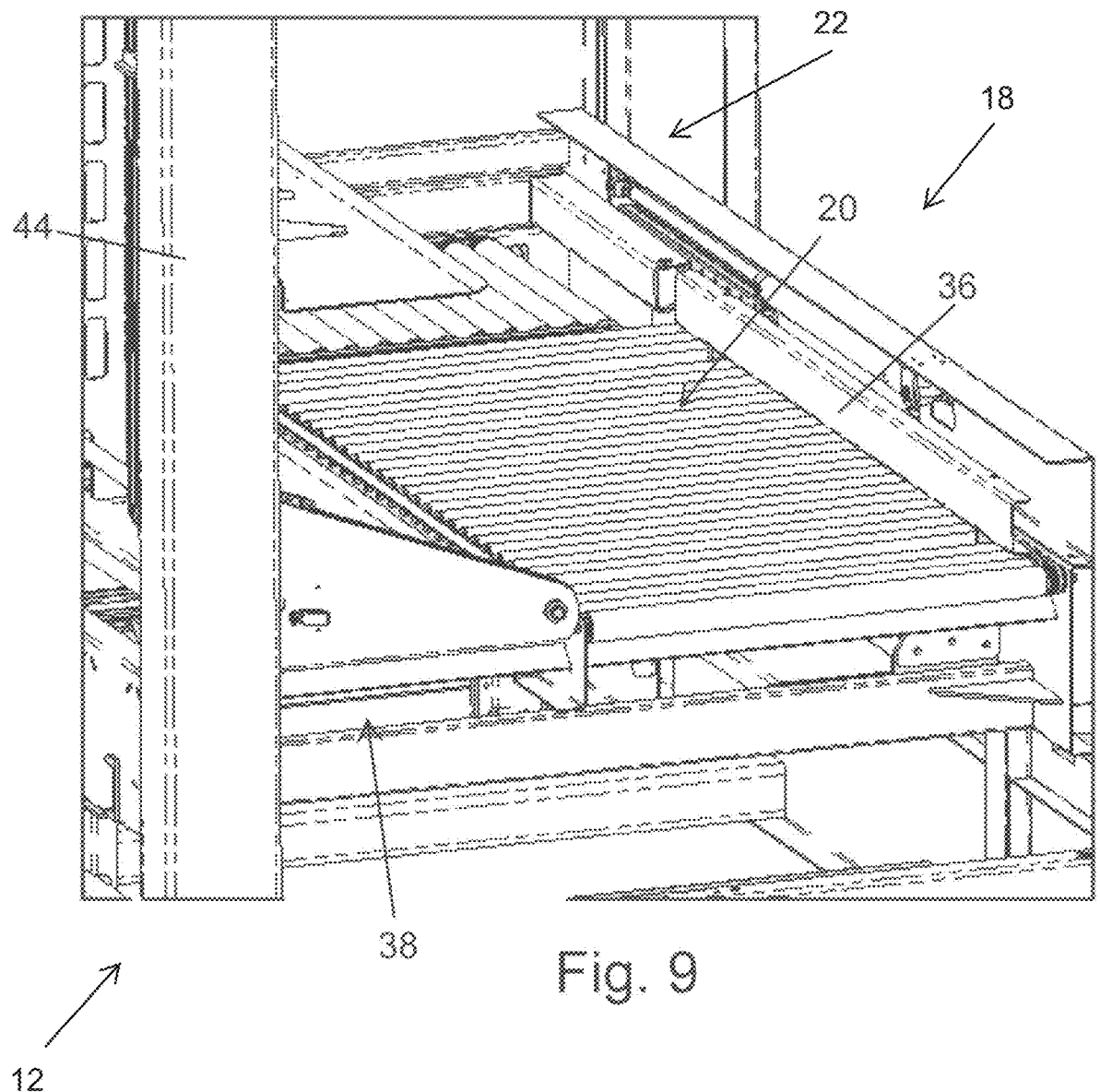
FIG. 9 is a perspective view of the apparatus according to the invention including the pick and place assembly, the row build components in which the pusher bar is retracted to its home, or fully open position and in which the pick and place mechanism in its home position ready to receive a completed row.

Row pusher 36 is mounted to support bars 37 that travel in gaps between rollers 20 that define the row build surface 18 and the pusher is moved with a rodless air cylinder 80 (FIG. 8) that moves the row pusher from the fully retracted position (FIG. 9) to the fully extended position, or until a row being pushed makes contact with a backstop 46 that is located near the back of the roller floor support surface 38 (FIG. 3). A home sensor 82 detects when the row pusher 36 is fully retracted, and an intermediate position sensor 84 on the rodless air cylinder detects when the pusher 36 is at or near contacting the roller floor support surface 38, as detailed below. In FIG. 9 the row pusher 36 is fully retracted to the home position to allow items to being inducted onto the rollers 20 that define row build surface 18 (from the sweep and turn mechanisms). Also in FIG. 9, the pick and place carriage 12 is at a home position with the roller floor support surface 38 coincident with row build surface 18 and ready to receive a completed row from the row build surface via the pushing with row pusher 36.

With returning reference now to FIG. 3, the pick and place carriage 12 is shown isolated and comprises a roller floor support surface 38 onto which completed rows built by the row build and sweep and turn infeed systems just described, are transferred with the pusher 36. The roller floor support surface 38 is best seen in FIGS. 3 through 7 and is defined by plural rollers 40 that extend transverse to the longitudinal axis of the rollers 20 that comprise the row build surface 18, and a dead plate, or apron 41 that is coincident with and in the same horizontal plane as rollers 40, and in FIG. 9, in the same horizontal plane as the upper layer of rollers 20 when items, rows are being transferred from the rollers 20 onto the support surface 38.

Figure 4:
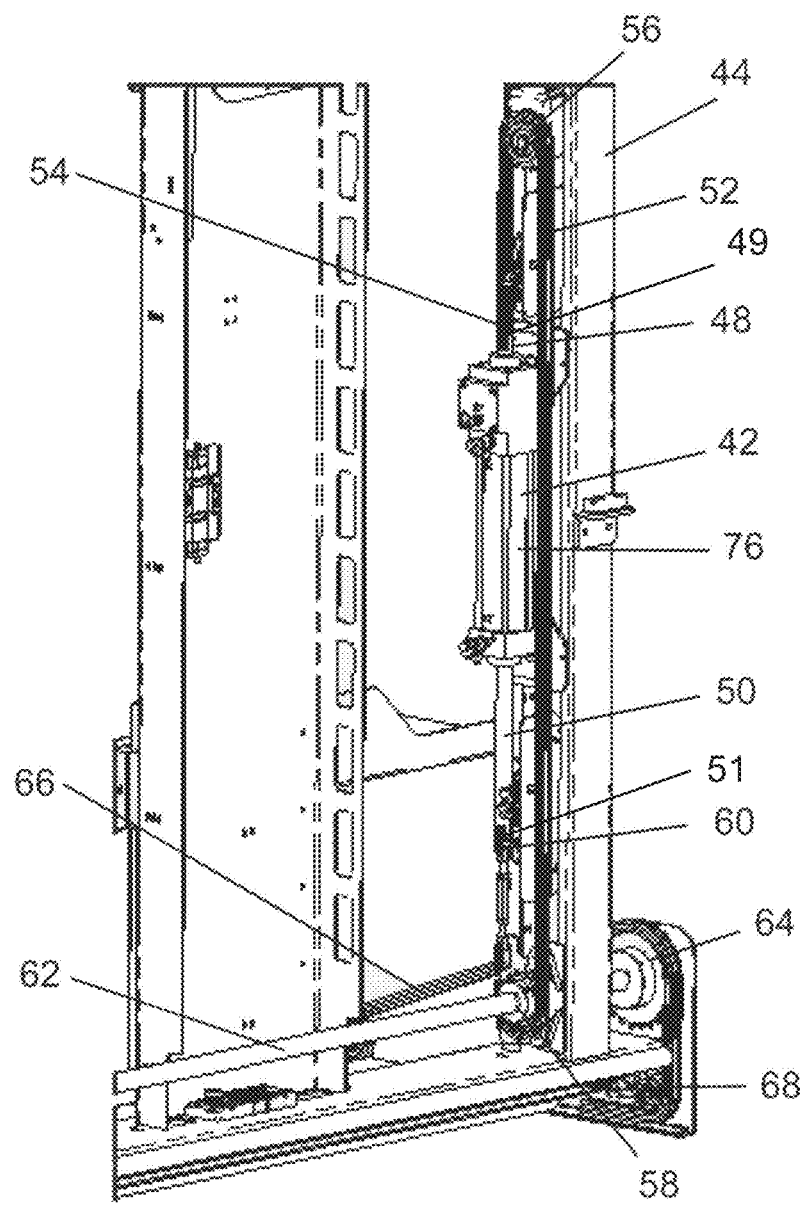
FIG. 4 is rear perspective and partial view of a pick and place carriage illustrating the double-rod air cylinder utilized in the present invention to drive the mechanisms that move the roller support floor.

Roller floor support surface 38 is opened and closed with a double rodded air cylinder 42 (FIG. 4) that is attached to an upright frame member 44 of pick and place carriage 12 and which is arranged to turn linear motion of the cylinder rods into rotary motion of the roller floor support surface. With continuing reference to FIG. 4, the double rodded air cylinder 42 is mounted so that the rods—upper rod 48 and lower rod 50 move vertically and simultaneously. Thus, when upper rod 48 is retracted as in FIG. 4 (i.e., the distal end 49 of the rod is moved in the downward direction so that the distal end 49 is positioned closely adjacent to the body of air cylinder 42), and lower rod 50 is extended by the same amount (i.e., the distal end 51 of the rod 50 is moved downwardly so that the distal end 51 is spaced downwardly away from the body of air cylinder 42). A chain 52 has its first end 54 attached to the distal end 49 of the upper rod 48, extends over an upper cog 56 and back downwardly around a lower cog 58, with the second end 60 of the chain 52 attached to the distal end 51 of lower rod 50. A shaft 62 extends through lower cog 58 and is journaled to the lower portion of upright frame member 44 (the shaft 62 is similarly journaled to the opposite upright frame member, which is not shown in FIG. 4). The shaft 62 extends outwardly of the upright frame members 44 on both ends of the shaft and an outboard cog 64 is attached to each end (only one outboard cog 64 is shown in the partial view of FIG. 4).

Figure 5:
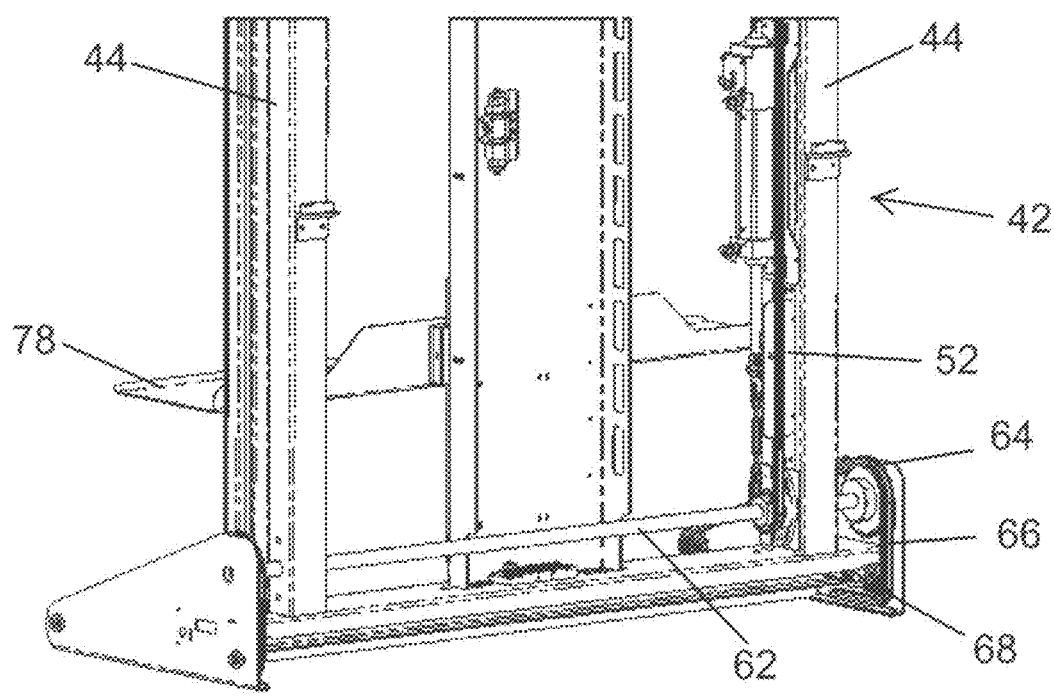
FIG. 5 is a rear perspective view similar to FIG. 4 but showing more components of the assembly.
Figure 6:
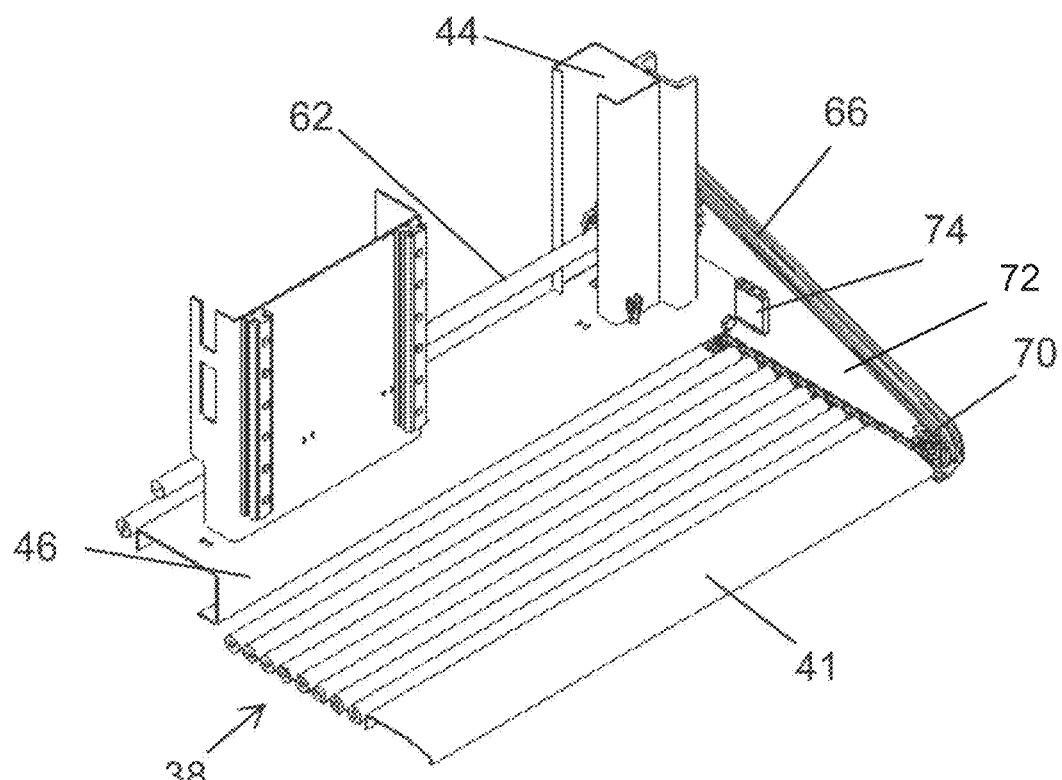
FIG. 6 is a cut away perspective view of the roller support floor with the upper part of the chain loop supporting the roller floor tubes shown on the angled part of the frame.
Figure 7:
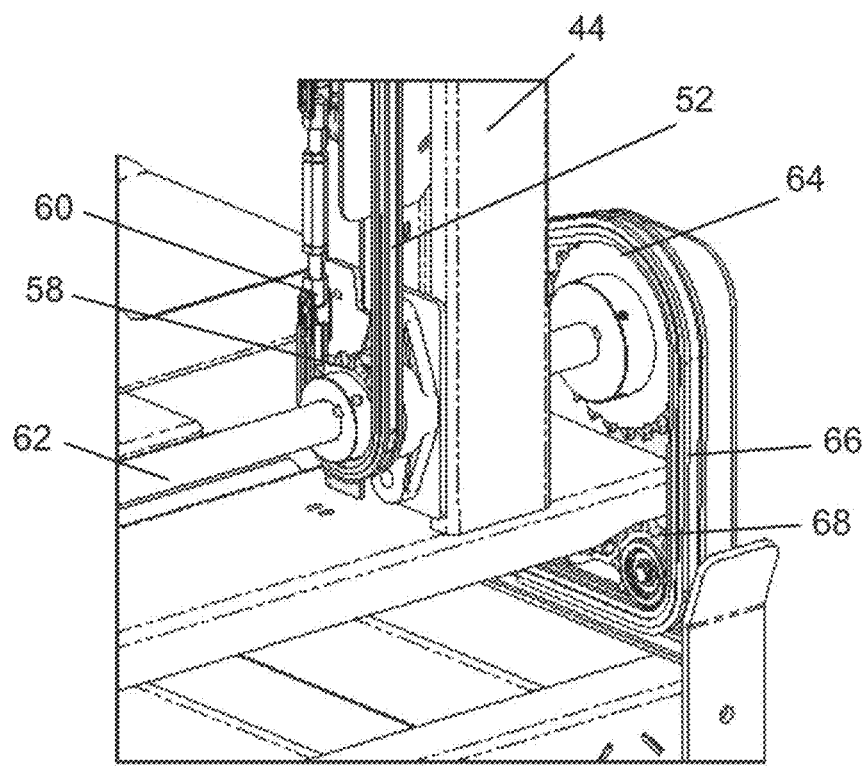
FIG. 7 is a rear, perspective view of the chain assembly according to the invention that drives the roller support floor.
Figure 10:
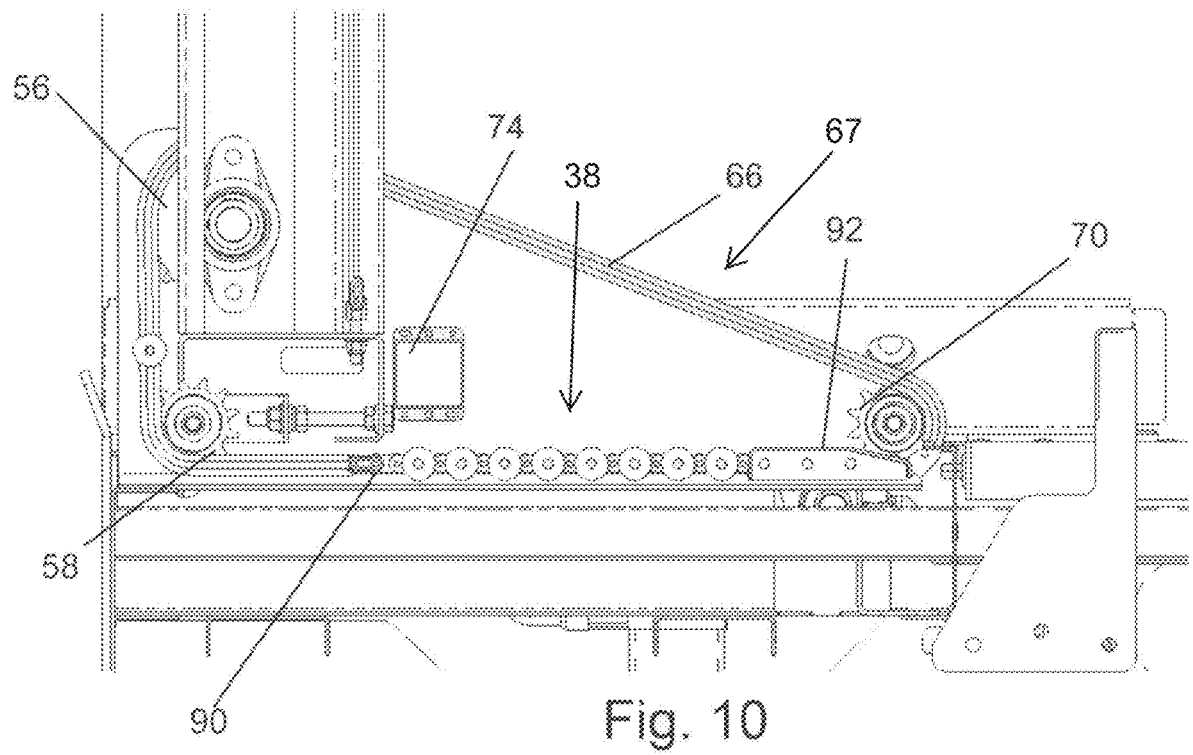
FIG. 10 is a cut away and side elevation view of the roller support floor illustrating the interconnections between the chain that drives the roller support floor and the rollers.

As seen in FIG. 5 and the close up view of FIG. 7, a roller floor chain 66 extends around the outboard cog 64, around a lower cog 68 and forward around a forward cog 70 (see, for example, FIGS. 6 and 10) to define a triangular chain loop 67. The roller floor support surface 38 is attached to the opposite ends, 90, 92, respectively of triangular chain loop of the roller floor chain 66 as shown in FIG. 10, of course on both sides of the roller floor support.

It will be understood that as the rods 48 and 50 extend out of and retract into, respectively, the body of the air cylinder 42, the movement of the rods cause the chain loop defined by chain 52 to translate, and the translation of the chain causes the shaft 62 to rotate. As shaft 62 rotates, the outboard cogs 64 rotate and this causes the roller floor chain 66 to move, thus driving the roller floor support surface horizontally from the retracted position to the extended position. In the extended position the apron 41 (FIG. 3) is coincident with the rollers that define the row build system 22 (FIG. 1) and the roller floor support surface 38 is in close proximity to the facing edge of the rollers 20 of the row build surface so that items may be smoothly transferred from the row build surface onto the roller floor support surface 38 with the pusher 36. In the retracted position shown in FIG. 2 the rods 48 and 50 have moved to the opposite position and the roller floor support surface has moved up the back side of the pick and place frame, thereby allowing items that were place onto the floor surface to be deposited on a pallet. Thus, as the rods 48 and 50 translate they cause chain 52 to rotate as described above, and this causes rotation of the chain loops 67 to thereby move the roller support surface 38 between the extended and retracted positions.

As seen in FIG. 6, which is a cut away view of the roller floor support surface 38 shown with the upper part of the roller floor chain 66 that is supporting the tubes of the roller floor support surface, the chain 66 extends around the angled frame 72. As noted, the chain loop 67 of chain 66 is basically a triangle. To the left of the roller floor support surface 38 is the carriage backstop 46 and a backstop sensor 74 that senses when a row of items is pushed against the carriage backstop and thus detects the leading edges of the row of items.

Figure 2:
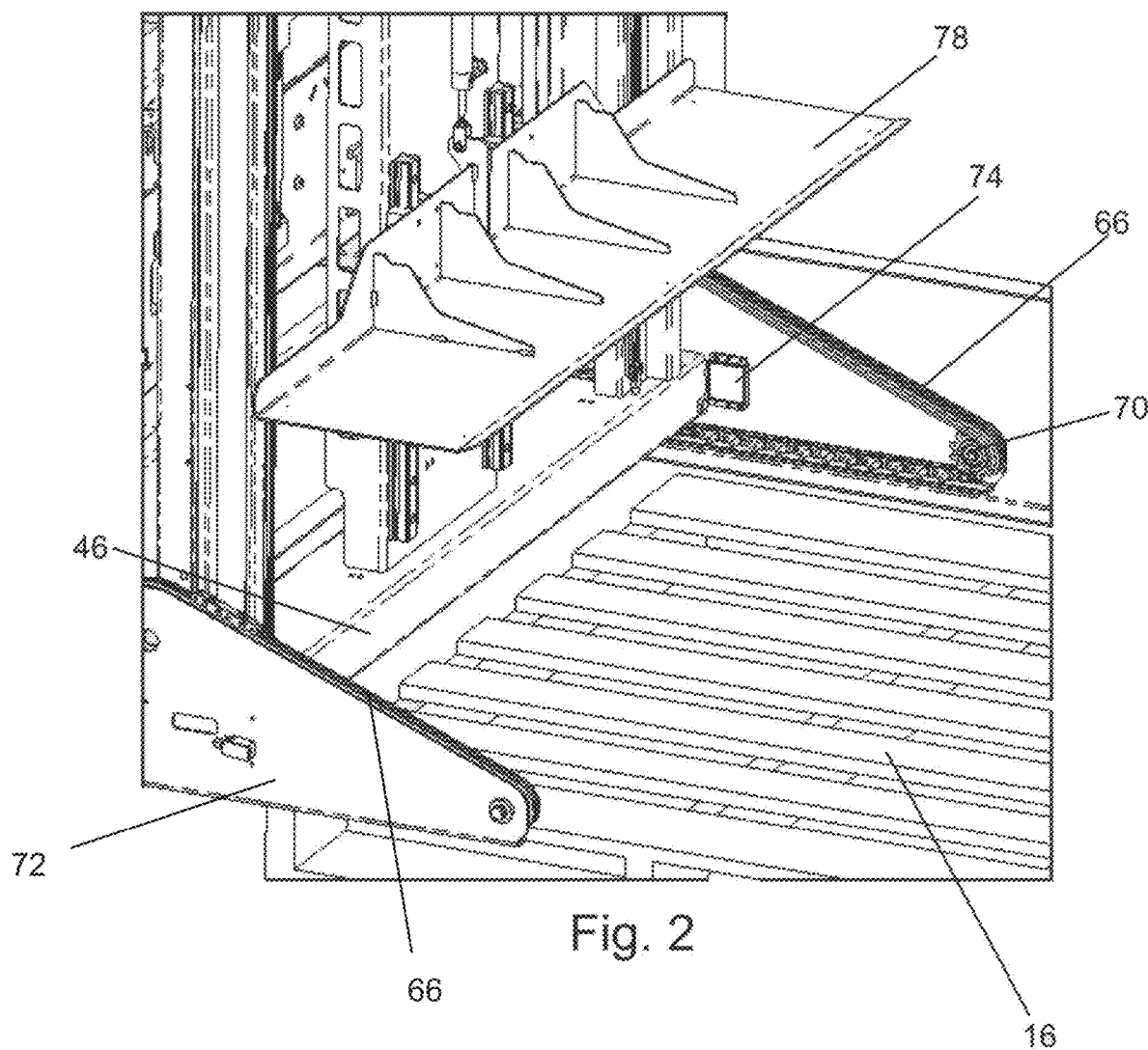
FIG. 2 is a perspective view of the pick and place carriage of the invention shown in isolation adjacent a pallet.
Figure 11:
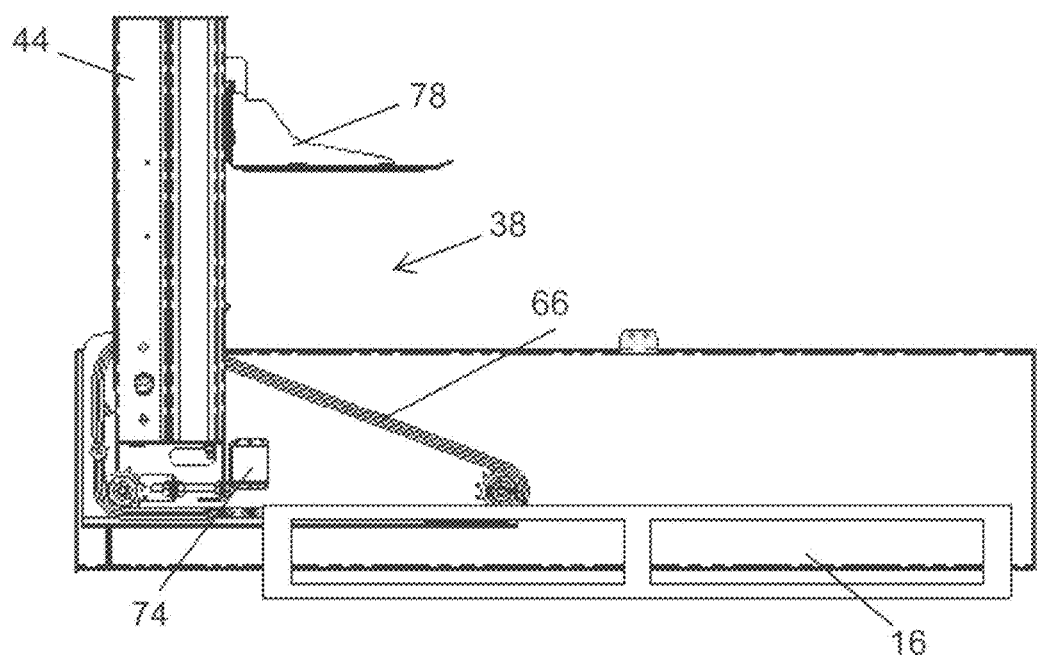
FIG. 11 is a side elevation view illustrating the pick and place assembly adjacent a pallet with the roller support floor withdrawn.

In one embodiment, when fully extended (as detailed below) and as shown in, for instance, FIG. 3, the roller floor support surface 38 preferably provides about 15" of support surface for a row, measured between the outermost edge of apron 41 and backstop 46. Full extension of air cylinder 42 drives roller floor support surface 38 into the fully open-floor position (as shown, for example, in FIG. 11); in this position, assembled rows are transferred to an underlying and awaiting pallet 16 (those of skill in the art will appreciate that the pick and place apparatus translates from the position shown in FIG. 1 to a deposit position in which the assembled rows are deposited on the underlying pallet, although that position is not shown). Full retraction of the air cylinder moves the support floor to the fully closed, or support position, which is shown in FIG. 2. When moved into the fully open position shown in FIG. 11, the roller floor support surface 38 is retracted and rotates around the back and over the top of the rear of the pick and place frame 14.

The double rodded air cylinder 42 incorporates an internal lock 76 that is operable to lock the roller floor support surface 38 in the open position, and in the closed position when required. The lock 76 can also be released, thereby allowing the support surface 38 to be moved independent of motion provided by the air cylinder 42 with its chain system already described.

As noted, when in its fully extended position, the roller floor support surface 38, nominally, and in this described and illustrated embodiment, preferably provides about 15 inches of surface on which items may be supported. Of course, the dimensions are not critical and can be varied according to need. Continuing with the illustrated embodiment, if a row that has cases of greater than 15 inches is built and pushed by the pusher bar 36 onto the support surface 38 so that the leading edge of the cases abuts the backstop 46, the trailing edges of the cases will overhang the edge of the support surface, that is, the outermost edge of the apron 41. That overhang is not a problem so long as there is adequate support for the cases in the row, typically such that about ⅔ of the width of the cases rests on the support surface 38. But in the instance where the row comprises narrower cases, for instance, if 10 inch deep cases were being handled, the pusher 36 would push the row onto the surface 38 only until the pusher made contact with the outermost edge of the surface 38 (defined by the outermost edge of apron 41) and the leading edge of the cases would not make contact with the backstop 46. If this situation occurred, as the roller floor support surface 38 was pulled out from beneath the row cases to allow them to be transferred onto a pallet (or a building load) the cases would travel with the floor as the floor moves, thereby depositing the cases in off positions by at least several inches and the cases would tend to not be snugly positioned. An optional top clamp 78 (FIGS. 1, 2) could potentially hold the row in position during retraction of roller support surface 38, but reliability and evenness of the row would not be nearly as good as with a row in which the back of each case abuts and registers against the backstop 46.

According to the present invention, when a row of narrower items is being pushed by the pusher 36 from the row build surface 18 onto the appropriately positioned roller floor support surface 38 and the pusher 36 passes the intermediate position sensor 84 on the air cylinder 80 that drives the pusher 36, the sensor signals the lock 76 associated with the double rodded air cylinder 42 to release. Thus, the lock 76 on the cylinder 42 releases at the same time the pusher stroke makes contact with the outermost edge of the roller support. When the leading surface 39 of pusher 36 makes contact with the roller floor support surface 38, as detailed above, the pusher 36 pushes on apron 41 and thereby pushes the roller floor support surface (which has been released by virtue of release of lock 76) back simultaneously with row of items. More specifically, in a first embodiment there is established a contact point between the pusher 36 and the apron 41 located on the support bars 37 below the rollers 20 so that movement of the pusher 36 causes movement of the roller floor support surface. The point of contact may be defined by the support bars 37 or a separate appendage on the support bars. As such, it is possible with the pusher 36 to move roller floor support surface 38 back further if desired, reducing the width of the roller floor support surface, with an appendage on support bars 37 residing below rollers 20, thereby allowing all widths of items handled to overhang the outermost edge of apron 41. Release of the lock 76 on the cylinder 42 thus allows the roller floor 38 to be pushed by the pusher bar 36 (rather than through the action of cylinder 42). When the leading edges of the cases in the row abut the backstop 46, the backstop sensor 74 detects the position of the leading edges and the pusher 36 stroke stops so that the items in the row conform to the reduced width of the roller floor support surface. When the row being pushed triggers backstop sensor 74 the row pusher 36 retracts through action of air cylinder 80 and the rod lock 76 is reengaged, thereby leaving the roller floor support surface 38 with the same width as the items that are being supported on it. If the items in the row are greater than 15 inches in width as described above, the backstop sensor 74 is triggered before the intermediate point sensor 84 of the row pusher 36.

The top clamp 78 functions to stabilize the row during transport and deposit. Once a row is assembled on roller floor 38 and the leading edges of the items in the row are abutting the backstop 46, the top clamp 78 lowers to make contact with the top surface of the items in the row for stability. With single case rows the top clamp is less important, but with rows that are two and three items deep the rows will receive more benefit from the top clamp.

Based on the foregoing description of the row support apparatus 10 and the operation thereof, it will be appreciated that the apparatus defines an automatic and self-conforming support surface for rows comprised with varying widths. As each row handled has a uniform width, though the width is variable between rows, a parallel, flat faces is deposited onto the next adjacent row with parallel, flat faces.

Moreover, it will be appreciated that because the roller floor support surface 38 is rolled vertically up the back of the framework assembly when retracted, as described, the effective width of the entire apparatus is very narrow. The 15-inch support surface disappears relative to the load being built so there is nominal wasted space between the pick and place carriage 12 and the row build area, thereby allowing a smaller machine footprint for a bottom support row build palletizer.

The following is a description of the operational aspects of the invention described above. As noted, the entire apparatus is under the control of the controller 34.

A. items such as cases 94 are delivered from an infeed system to the sweep and turn system 22;

B. individual or plural items are oriented pursuant to the build menu 32 by the sweep and turn system 22 and are delivered to the row build surface 18 where a row of items is formed;

C. when a row of items is formed on the row build surface the pusher bar 36 pushes the row across the row build surface toward and onto the waiting roller floor support surface 38, which is at the same horizontal level and the row build surface 18;

D. If the width of the items in the row is equal to or greater than the width of the roller floor support surface 38, the pusher bar pushes the row until the leading edges of the items in the row abuts the backstop 46—when the row is abutting the backstop the backstop sensor senses the position and causes the pusher to be retracted to its home position;

E. If it is being utilized, the top clamp 78 then lowers to secure the row of items on the row build support;

F. The roller floor support surface 38 is moved horizontally downwardly and the pick and place apparatus, with the secured row of items, is shuttled over a waiting pallet and the roller floor support surface 38 is withdrawn from beneath the row of items to deposit the row on the pallet in the desired location;

G. If the width of the items in the row is less than the width of the roller floor support surface 38, the pusher bar pushes the row until the intermediate position sensor 84 on the air cylinder 80 detects that the pusher has reached the mid-point of its pushing stroke and the lock 76 of air cylinder 42 is released. At that point the pusher support rods 37 make contact with the apron 41 and pushes the row of items and the roller floor support surface 38 to thereby reduce the width of the roller floor support surface 38 until the leading edges of the items in the row abut the backstop 46. At this point, the width of the roller floor support surface 38 is equal to the width of the row. Again, when the row is abutting the backstop the backstop sensor senses the position and causes the pusher to be retracted to its home position;

H. The top clamp 78 then lowers to secure the row of items on the row build support;

I. The roller floor support surface 38 is moved horizontally downward and the pick and place apparatus, with the secured row of items, is shuttled over a waiting pallet and the roller support floor is withdrawn from beneath the row of items to deposit the row on the pallet in the desired location.

Those of skill in the art will readily appreciate the interchangeability of various known components with those detailed above and in the drawings in order to accomplish the same functionality. As an example, the various drive cylinders described above (e.g., double-rodded air cylinder 42 and rodless air cylinder 80) may be replaced with any appropriate pneumatic cylinder, or other types of drives. And the rollers 20 that are used in the row build system 22 and rollers 48 used in roller floor support surface 38 may be replaced by other equivalent, known mechanism. These are just a few examples of equivalent structures that may be utilized.

It should be noted that while the invention has been described with reference to induction of one or a few cases of a row onto the row build surface, there is no reason why a row needs to be a sequential series of single cases entering the sweep and turn apparatus to build the row. Instead, there are many options for forming the row such as a series of like-grouped two or three cases may be released from the upstream infeed to the sweep and turn and those groups subsequently become a row for picking and placing. The variations on case orientation and alignment for row building are numerable.

Figure 13:
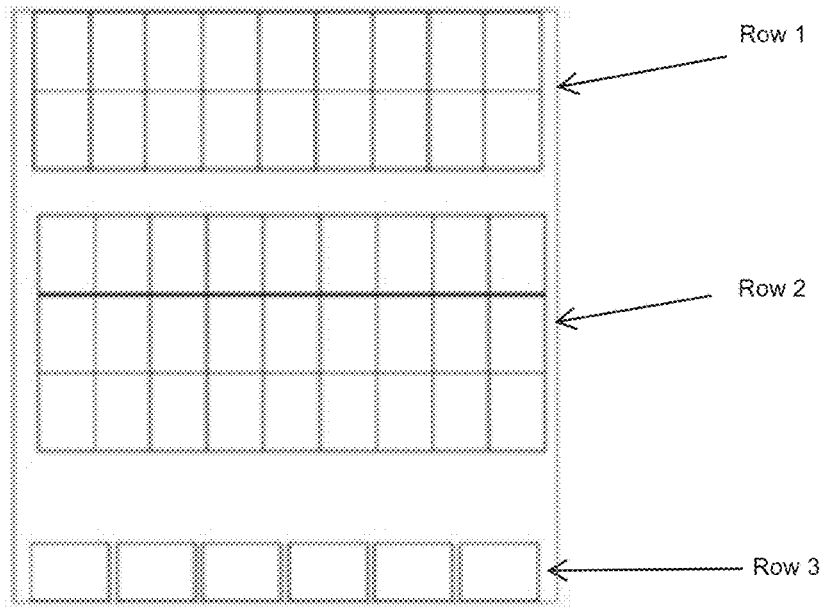
FIGS. 13 through 15 are schematic illustrations of different ways in which items such as cases (illustrated) may be arranged and placed to build a layer of items on a pallet. More specifically.
Figure 14:
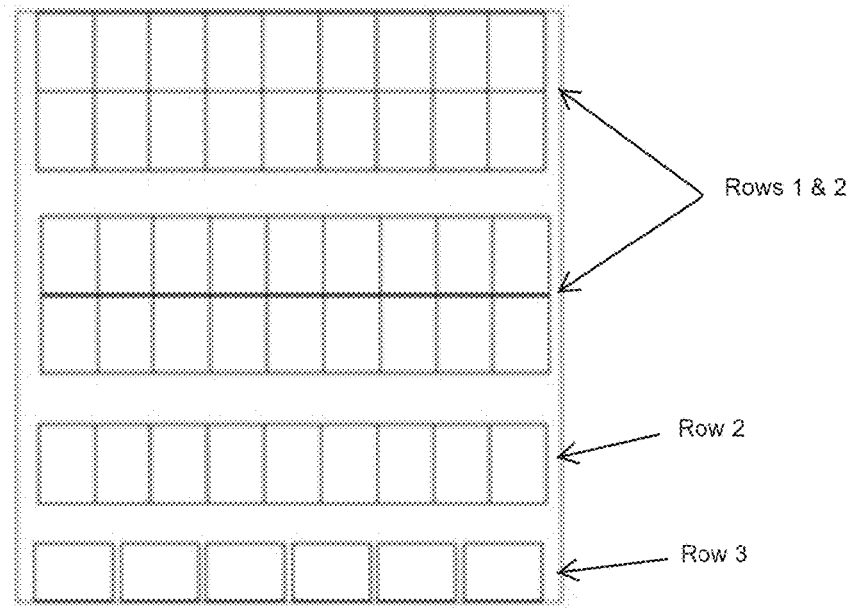
Figure 15:
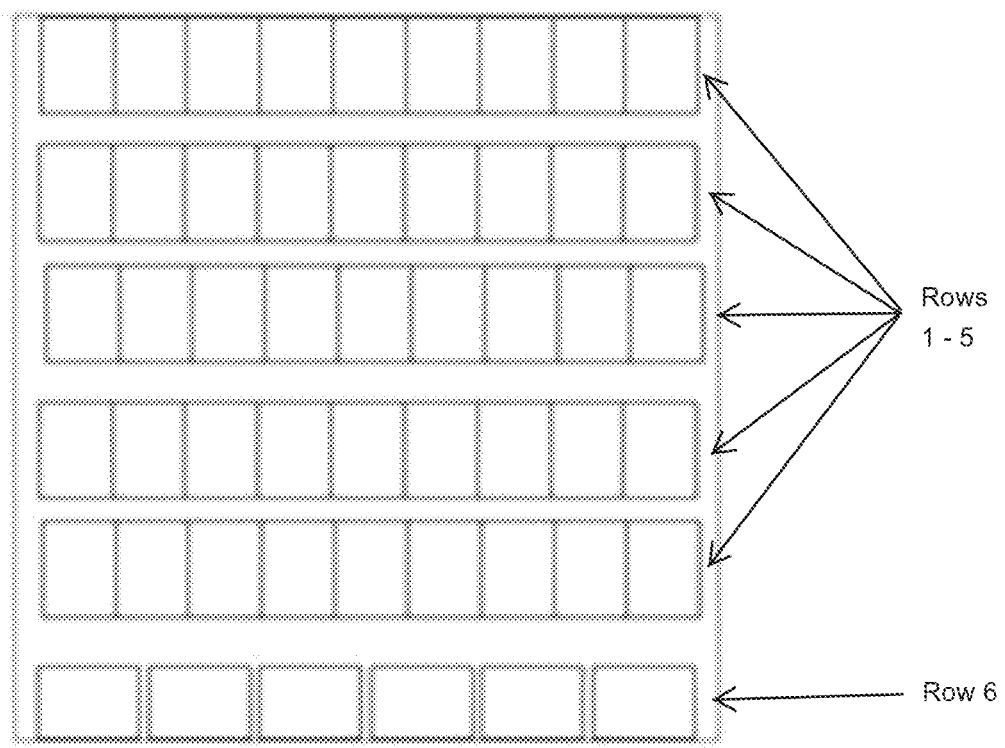

With reference to the series of illustrations in FIGS. 13, 14 and 15, three of the numerous row building options are illustrated with narrative explanations of the manners in which the rows have been formed by the sweep and turn apparatus. These three illustrations merely show three of many, many different arrangements for purposes of explaining the invention.

Figure 16:
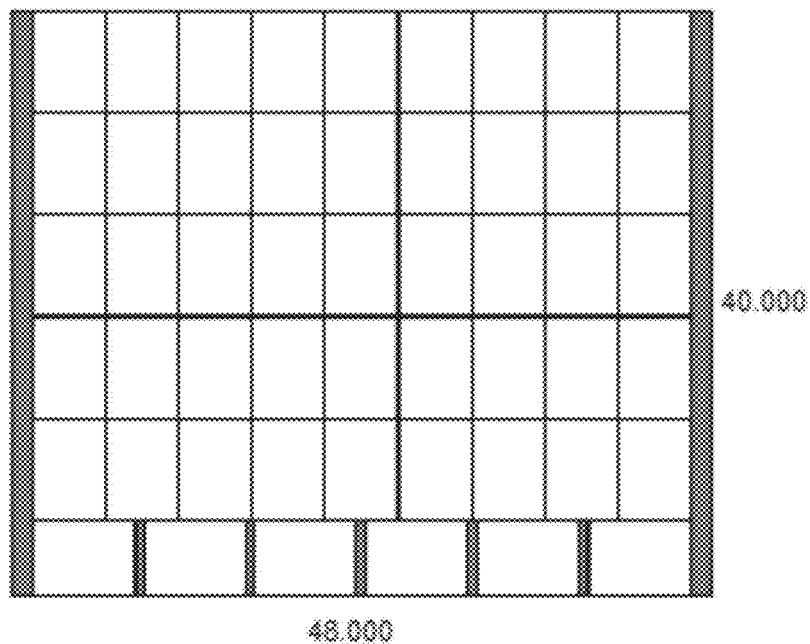
FIGS. 16 through 19 are illustrations of a row and layer build pattern of cases (illustrated) on a pallet. More specifically.
Figure 17:
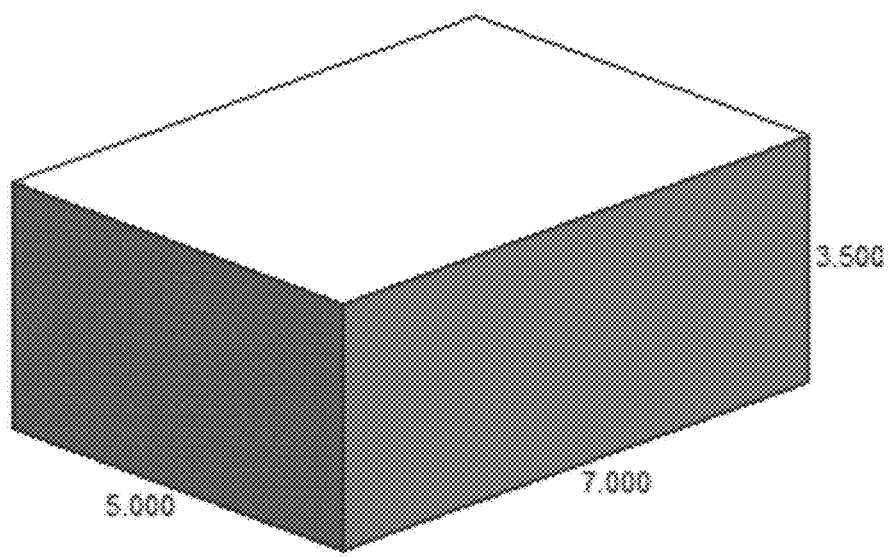
Figure 18:
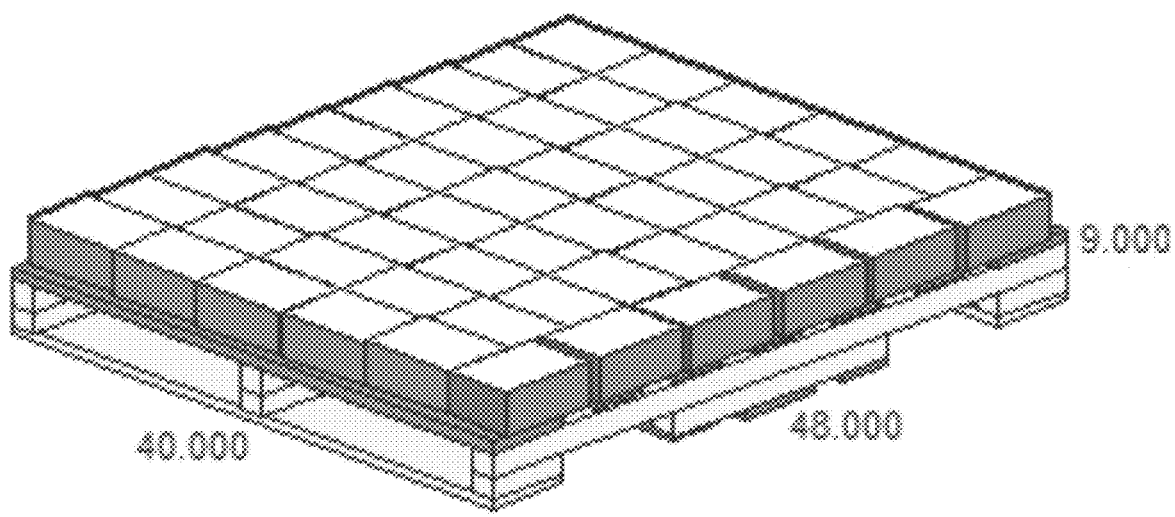
Figure 19:
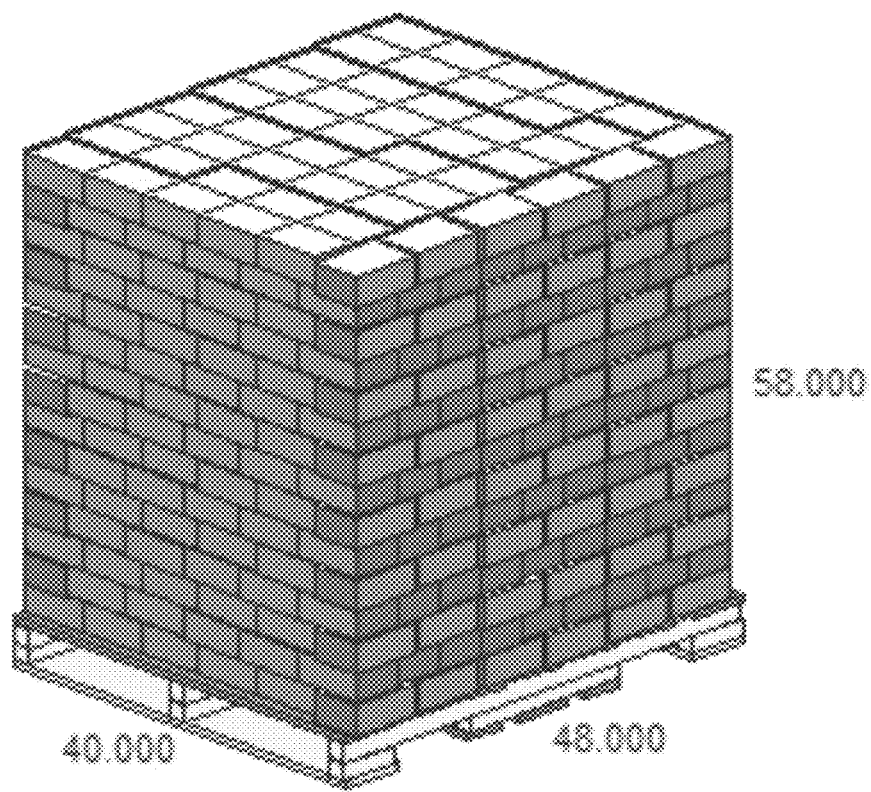

FIGS. 16 through 19 further illustrate row, layer, and load build options with respect to a single case (shown in FIG. 17) that has nominal dimensions of 5×7×3.5 inches. In FIG. 16 a single layer has been deposited on a pallet wherein the layer comprises 6 rows. In rows 1 through 5 there are 9 cases oriented in a first orientation and in row 6 there are 6 cases that are oriented rotated 90 degrees relative to the cases in rows 1 through 5. The single layer is shown in perspective view in FIG. 18 and an entire load comprising 15 layers is shown in FIG. 19. It may be seen that adjacent layers have been "rotated" relative to the next adjacent layer in order to build a stable load. Again, the row, layer and load arrangements shown in the series of illustrations of FIGS. 16 through 19 are exemplary only.

The present invention has been described in terms of preferred and illustrated embodiments, it will be appreciated by those of ordinary skill that the spirit and scope of the invention is not limited to those embodiments, but extend to the various modifications and equivalents as defined in the appended claims.

The invention claimed is:

1. An adjustable row support floor for items on a palletizer, comprising:
   a row build platform;
   a row moving implement movable from a home position to an extended position and an intermediate point sensor for detecting when the row moving implement is at a point between the home and extended positions;
   a row support floor movable from a first position to a second position;
   a row support floor mover engaged to the row support floor for moving the row support floor between the first position and the second position, and a release for releasing the row support floor mover so that the row support floor may be moved independently to a third position between the first and second positions.

2. The adjustable row support floor according to claim 1 in which the row support floor mover comprises a double-rodded pneumatic cylinder, and wherein the release disengages the double-rodded pneumatic cylinder.

3. The adjustable row support floor according to claim 2 in which the release is activated by movement of the row moving implement.

4. The adjustable row support floor according to claim 3 wherein when the row moving implement is at a position between the extended and home positions the intermediate point sensor causes the release to be activated and the row moving implement thereafter moves the row support floor.

5. The adjustable row support floor according to claim 1 wherein items are assembled in a row on the row build platform, wherein the row has a width X and the row support floor has a width Y, and the row moving implement causes the row to be transferred onto the row support floor.

6. The adjustable row support floor according to claim 5 wherein if the width X is greater than the width Y the row moving implement causes the row to be transferred onto the row support floor until a leading edge of the row abuts a backstop.

7. The adjustable row support floor according to claim 6 including a backstop sensor to detect when the leading edge of the row abuts the backstop and cause the row moving implement to move to its home position.

8. The adjustable row support floor according to claim 5 wherein if the width X is less than or equal to the width Y the intermediate point sensor releases the engagement between the row support floor mover and the row support floor and movement of the row moving implement causes movement of the row support floor to thereby reduce the width Y until the width Y is about equal to the width X.

9. A method of palletizing items, comprising the steps of:
   a. forming a row if items on a row build surface, the row defining a leading edge;
   b. with a row mover, moving the row from the row build surface to a row support surface having a width Y and detecting the position of the row mover and detecting the leading edge of the row; and
   c. if the row mover is detected to have moved past a selected intermediate point before the leading edge of the row is detected, reducing the width Y.

10. The method of claim 9 in which the row of items has a width X and including reducing the width Y until it matches width X.

11. The method of claim 10 in which the width of the row support surface is reduced by pushing the row support surface with the row mover.

12. The method according to claim 11 including the step of releasing a lock on a row support surface mover if the row mover is detected to have moved past a selected intermediate point before the leading edge of the row is detected.

13. The method according to claim 9 wherein if the leading edge of the row is detected before the row mover is detected to have moved past the selected intermediate point the row mover the width Y is not reduced.

14. The method according to claim 13 wherein X>Y.

15. The method according to claim 13 wherein X=Y.

16. The method according to claim 9 including the steps of
a. forming plural rows of items on a row build surface, the plural rows defining a leading edge;
b. with a row mover, moving the plural rows from the row build surface to a row support surface having a width Y and detecting the position of the row mover and detecting the leading edge of the plural rows; and
c. if the row mover is detected to have moved past a selected intermediate point before the leading edge of the plural rows is detected, reducing the width Y.

17. An adjustable row support floor for items on a palletizer, comprising:
a row support floor that is selectively movable from an extended position to a retracted position by a driver, wherein the driver may be disengaged so that the row support floor is movable independently of the driver.

18. The adjustable row support floor according to claim 17 wherein when the row support floor is in the extended position it has a width Y and in the retracted position the row support floor has a width X that is less than width Y.

19. The adjustable row support floor according to claim 18 wherein when the driver is disengaged the row support floor is movable by a row pusher from the extended position to the retracted position.

20. The adjustable row support floor according to claim 19 in which the row pusher transfers items from a row build surface to the row support floor.

21. The adjustable row support floor according to claim 20 including a first sensor to detect the position of the row pusher, a second sensor for detecting the leading edge of items, and wherein the first sensor causes disengagement of the driver if the row pusher position is detected prior to the detection of the leading edge of the items.

22. An adjustable row support floor for items on a palletizer, comprising:
a row build platform;
a row moving implement movable from a home position to an extended position and an intermediate point sensor for detecting when the row moving implement is at a point between the home and extended positions;
a row support floor movable from a first position to a second position;
row support floor moving means engaged to the row support floor for moving the row support floor between the first position and the second position, and
release means for releasing the row support floor mover so that the row support floor may be moved independently to a third position between the first and second positions.

23. The adjustable row support floor according to claim 22 wherein the row support floor moving means further comprises a double-rodded pneumatic cylinder with each rod interconnected to the row support floor and a lock selectively from a locked position in which the pneumatic cylinder is locked and an unlocked position in which the pneumatic cylinder is unlocked.

24. The adjustable row support floor according to claim 23 wherein release means causes the lock to move from the locked to the unlocked position.

25. The adjustable row support floor according to claim 24 wherein when the lock is in the unlocked position the row support floor is movable by movement of the row moving implement.

* * * * *

UNITED STATES PATENT AND TRADEMARK OFFICE
CERTIFICATE OF CORRECTION

PATENT NO. : 11,834,279 B2
APPLICATION NO. : 17/634826
DATED : December 5, 2023
INVENTOR(S) : Stephen L. Heston It is certified that error appears in the above-identified patent and that said Letters Patent is hereby corrected as shown below:

In the Claims

Column 10, Lines 44-46, Claim 9 "A method of palletizing items, comprising the steps of: a. forming a row if items on a row build surface, the row defining a leading edge;" should read -- A method of palletizing items, comprising the steps of: a. forming a row of items on a row build surface, the row defining a leading edge; --

Signed and Sealed this
Ninth Day of April, 2024

Katherine Kelly Vidal
*Director of the United States Patent and Trademark Office*